US012717692B2

(12) United States Patent
Jaliminche et al.

(10) Patent No.: US 12,717,692 B2

(45) Date of Patent: Aug. 25, 2026

(54) ADAPTIVE CACHE MANAGEMENT FOR A STORAGE MEDIA SYSTEM

(71) Applicant: Marvell Asia Pte Ltd, Singapore (SG)

(72) Inventors: Lokesh Nagappa Jaliminche, Santa Cruz, CA (US); Erich F. Haratsch, San Jose, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 18/587,362

(22) Filed: Feb. 26, 2024

(65) Prior Publication Data

US 2025/0165372 A1 May 22, 2025

Related U.S. Application Data

(60) Provisional application No. 63/601,202, filed on Nov. 20, 2023.

(51) Int. Cl.

*G06F 11/34* (2006.01)
*G06F 11/30* (2006.01)
*G06F 12/08* (2016.01)
*G06F 12/0868* (2016.01)

(52) U.S. Cl.

CPC ...... *G06F 11/3409* (2013.01); *G06F 11/3037* (2013.01); *G06F 12/0868* (2013.01)

(58) Field of Classification Search

CPC ............. G06F 11/3409; G06F 11/3037; G06F 12/0868

See application file for complete search history.

(56) References Cited

U.S. PATENT DOCUMENTS

2018/0181494 A1* 6/2018 Malladi ............... G06F 12/0811
2021/0141738 A1* 5/2021 Barbalho .............. G06F 3/0688
2022/0058062 A1* 2/2022 Sztejna ................... G06F 9/545
2022/0222176 A1* 7/2022 Drewek-Ossowicka .................... G06F 9/5005
2023/0195372 A1* 6/2023 Kachare .................. G06F 3/061 711/154

* cited by examiner

*Primary Examiner* — Masud K Khan

(74) *Attorney, Agent, or Firm* — Colby Nipper PLLC

(57) ABSTRACT

The present disclosure describes apparatuses and methods for adaptive cache management for a storage media system. In aspects, an adaptive cache manager obtains telemetry information relating to access of a cache memory and access of storage media of a storage media system. Based on the telemetry information, the adaptive cache manager determines a cache policy for the cache memory and applies the cache policy to the cache memory to modify a caching scheme or a prefetching scheme for the data of the cache memory. In some cases, the adaptive cache manager receives caching parameters from an application or user of a host system and uses these parameters when determining the cache policy. By so doing, the adaptive cache manager may dynamically alter the caching and prefetch activities of the cache memory to improve efficiency of the cache memory.

20 Claims, 9 Drawing Sheets

100
102
104
106
108
110
112

Processors 114
Computer-Readable Media 116
System Memory 118
Tenants 120
Interconnect 122
Storage Media System 124
Cache Memory 134
Adaptive Cache Manager 136
Telemetry Unit 138
Storage Media 140
Storage Media Devices 142
I/O Ports 144
Graphics Processing Unit 146
Data Interfaces 148

126
128
130
132

Host 202
Compute Resources 204
Tenants 120
Tenant-0 120-0
Tenant-1 120-1
Tenant-2 120-2
Tenent-3 120-3
Tenant-n 120-n
Interconnect 122
Storage Controller 206-0
Cache Memory 134
Adaptive Cache Manager 136
Telemetry Unit 138
NAND
NAND
NAND
NAND
140
NAND
NAND
NAND
NAND
Channel A 208-1
Channel D 208-4
Solid-State Drive 130-0
Storage Controller 206-n
Cache Memory 134
Adaptive Cache Manager 136
Telemetry Unit 138
NAND
NAND
NAND
NAND
140
NAND
NAND
NAND
NAND
Channel A 208-1
Channel D 208-4
Solid-State Drive 130-m
Storage Media System 124

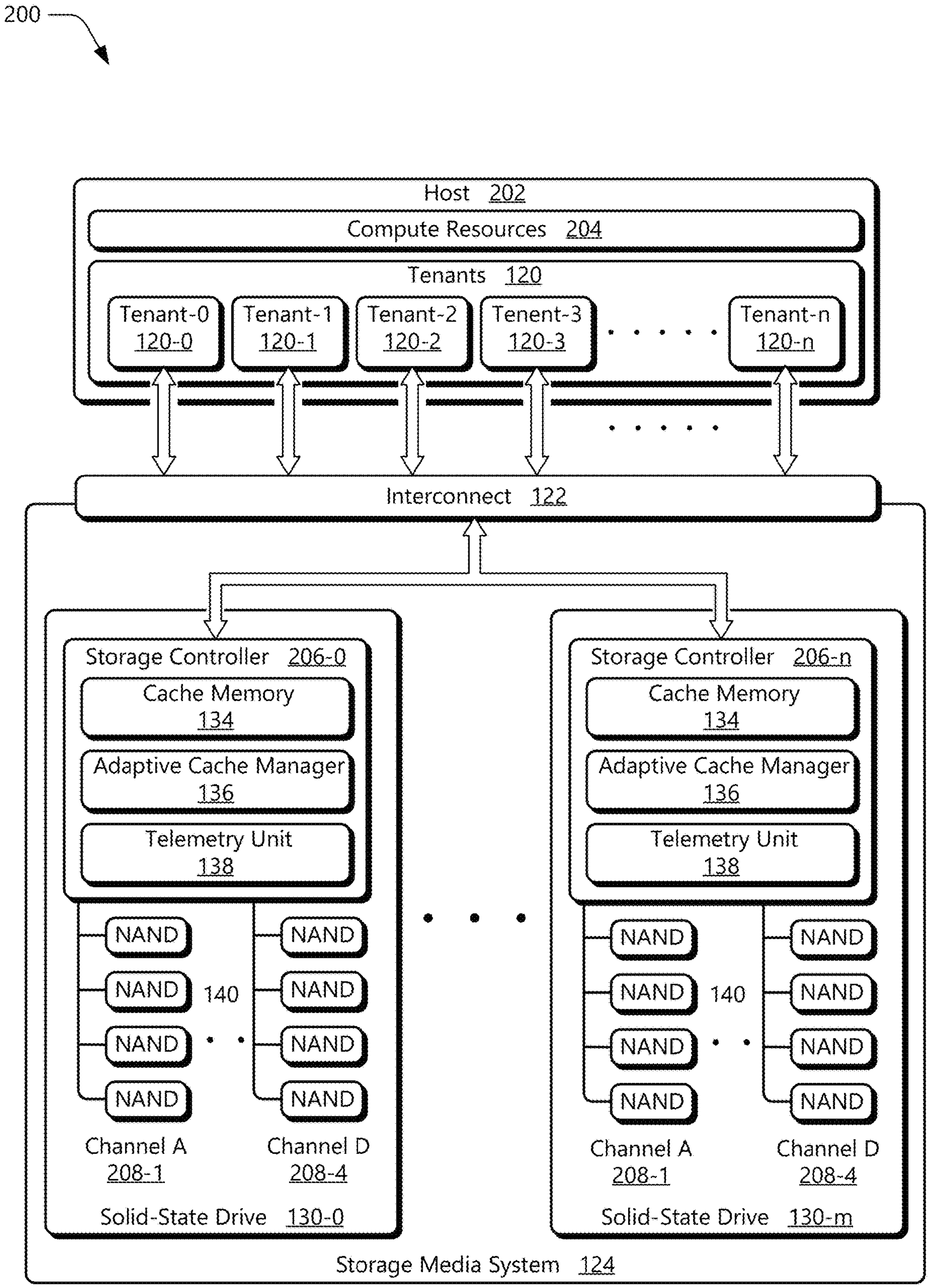

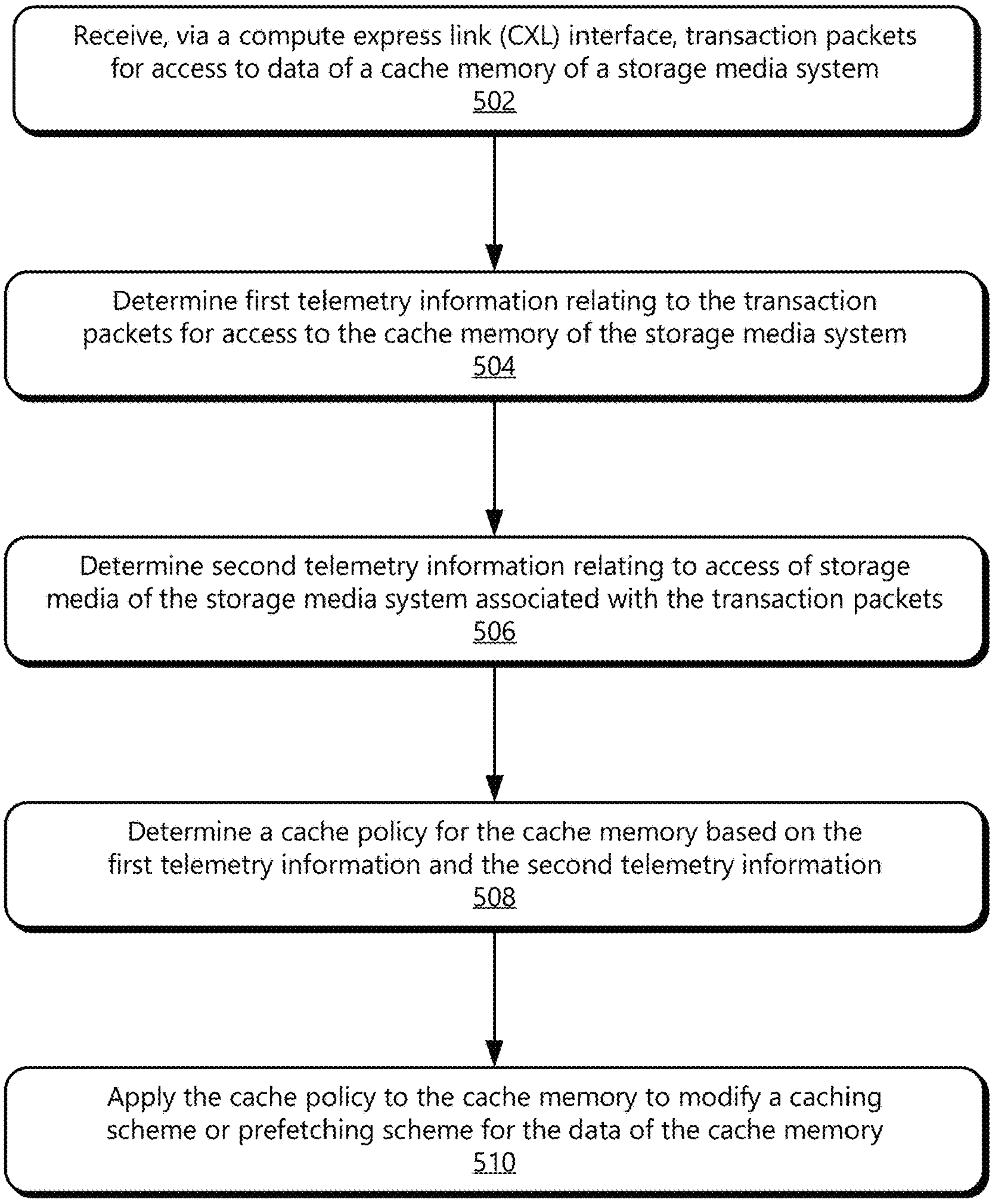

Fig. 5

Receive, via a compute express link (CXL) interface, transaction packets for access to data of a cache memory of a storage media system
502

Determine first telemetry information relating to the transaction packets for access to the cache memory of the storage media system
504

Determine second telemetry information relating to access of storage media of the storage media system associated with the transaction packets
506

Determine a cache policy for the cache memory based on the first telemetry information and the second telemetry information
508

Apply the cache policy to the cache memory to modify a caching scheme or prefetching scheme for the data of the cache memory
510

Receive cache parameters from a host system
602

Receive, via a compute express link (CXL) interface, transaction packets for access to data of a cache memory of a storage media system
604

Obtain telemetry information relating to the transaction packets for access to the cache memory and access to storage media of the storage media system
606

Determine a cache policy for the cache memory based on the telemetry information and the cache parameters received from the host system
608

Apply the cache policy to a caching engine of the cache memory
610

Apply the cache policy to a prefetch engine of the cache memory
612

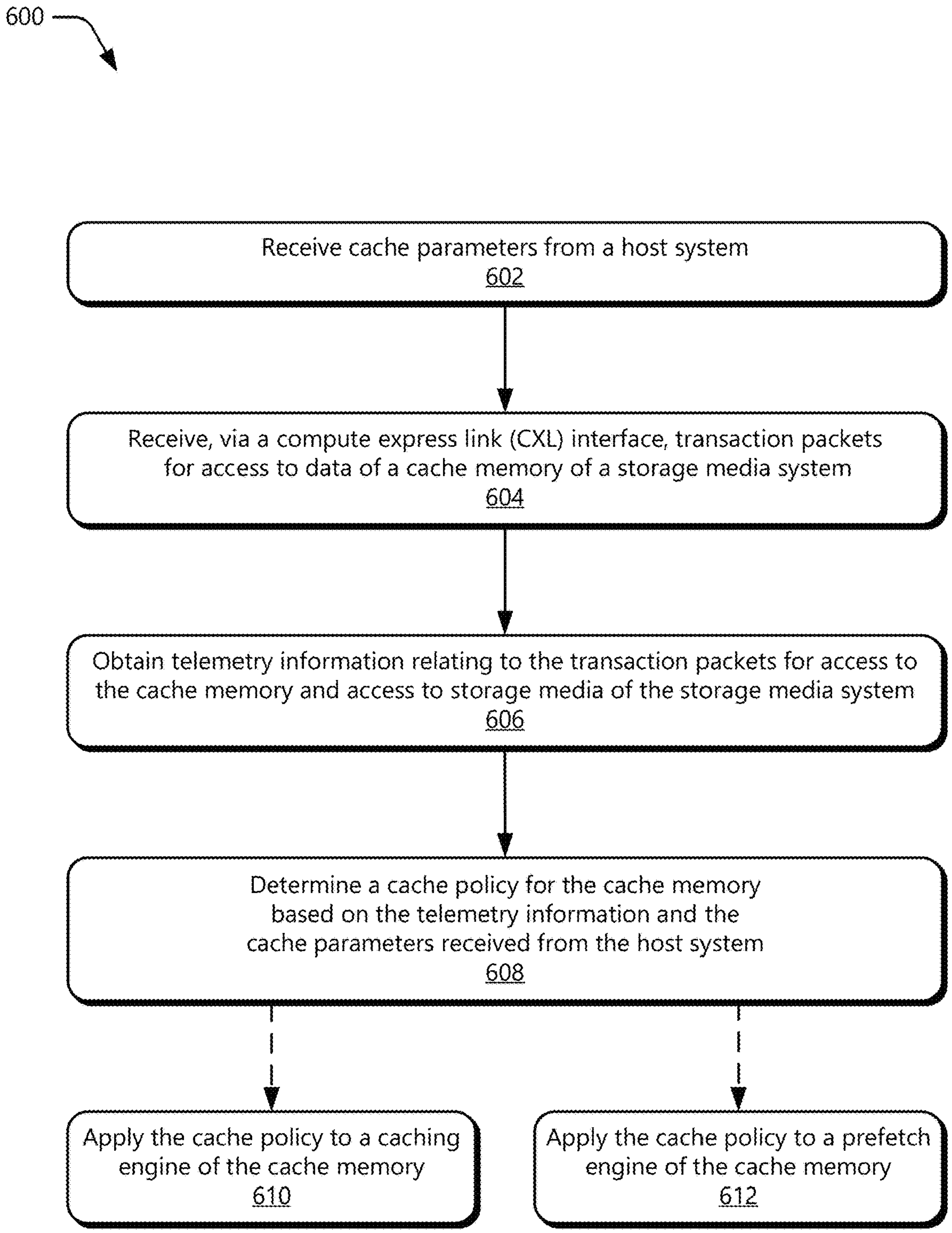

Fig. 6

Receive, via a compute express link (CXL) interface, transaction packets for access to data of a cache memory of a storage media system
702

Obtain telemetry information relating to the transaction packets for access to the cache memory and access to storage media of the storage media system
704

Provide the telemetry information to a machine learning model
706

Receive ML-based cache parameters from the machine learning model based on the telemetry information
708

Determine a cache policy for the cache memory using the ML-based cache parameters received from the machine learning model
710

Apply the cache policy to the cache memory to modify a caching scheme or prefetching scheme for the data of the cache memory
712

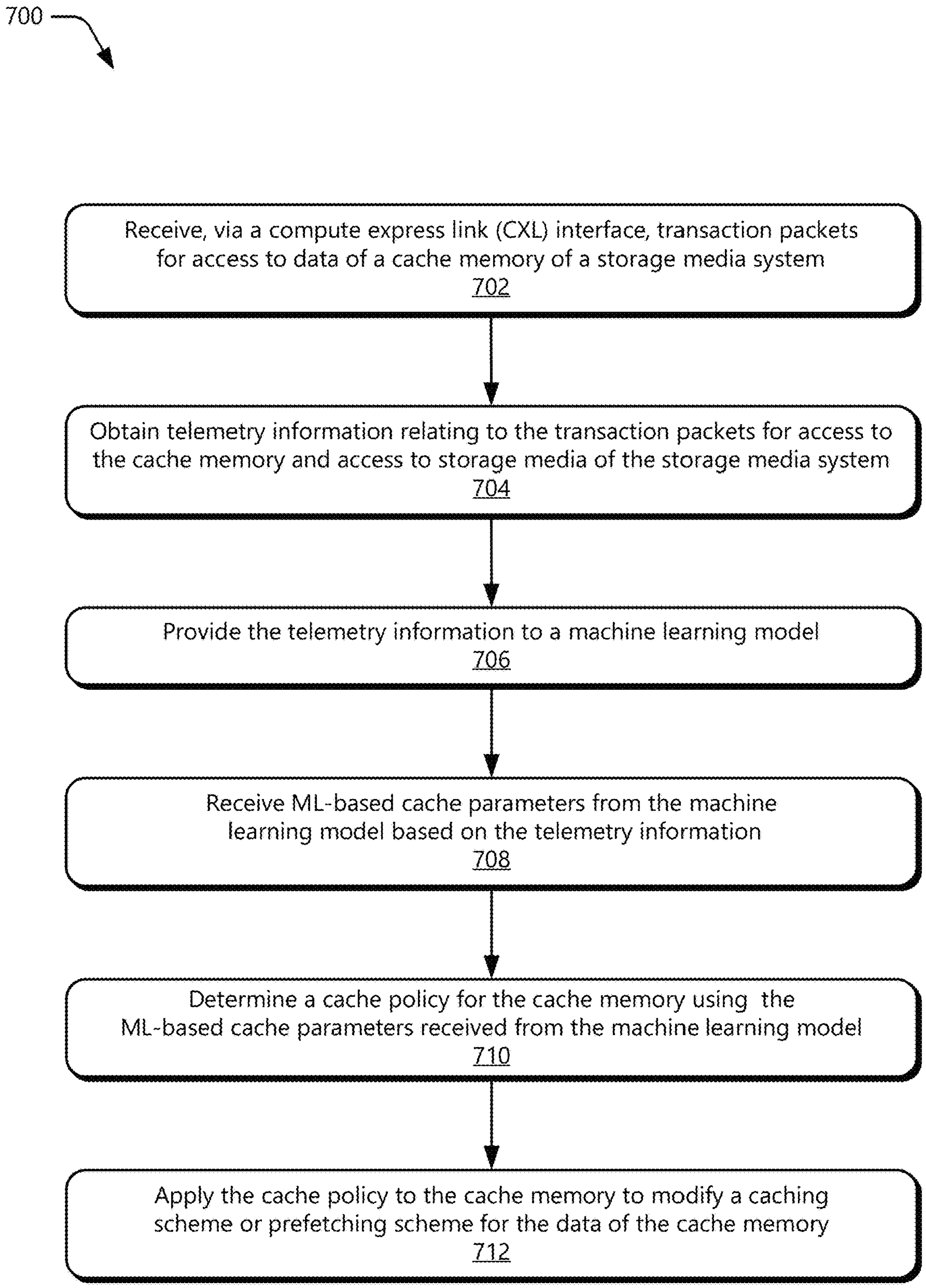

Fig. 7

ADAPTIVE CACHE MANAGEMENT FOR A STORAGE MEDIA SYSTEM

CROSS REFERENCE TO RELATED APPLICATION

This present disclosure claims priority to U.S. Provisional Patent Application Ser. No. 63/601,202 filed Nov. 21, 2023, the disclosure of which is incorporated by reference herein in its entirety.

BACKGROUND

Application and cloud service providers often implement enterprise-level data systems to collect and house vast amounts of data generated from ongoing operations, research, data mining, or other data sources. To accommodate the increasing volume of data collected from these sources, enterprise-level data systems are built with ever-increasing storage capacity to house the endless flow of incoming data. While data system architects are able to scale storage capacity with the larger volumes of data, low latency working memory available to various applications for accessing and analyzing the stored data have not scaled in commensurate fashion. When data requested by an application is not present in the working memory, the data system will fetch the requested data from storage, evict other data from the working memory to make space for fetched data, and place the requested data in the working memory for use by the application. Due to the higher latency of the storage and time consumed by operations to place the data, performance of complex applications that require large amounts of working memory (e.g., artificial intelligence or deep learning systems) is often impaired due to the limited capacities and inefficient data fetching schemes associated with conventional working memories.

SUMMARY

This summary is provided to introduce subject matter that is further described in the Detailed Description and Drawings. Accordingly, this Summary should not be considered to describe essential features nor used to limit the scope of the claimed subject matter.

In some aspects, a method for adaptive cache management includes receiving, from a host system and via a compute express link (CXL™) interface, transaction packets for access to data of a cache memory of a storage media system. The method includes determining first telemetry information relating to the transaction packets received from the host system for access to the cache memory and determining second telemetry information relating to access of storage media of the storage media system associated with the transaction packets. The method then determines a cache policy for the cache memory based on the first telemetry information and the second telemetry information and applies the cache policy to the cache memory to modify a caching scheme or a prefetching scheme for the data of the cache memory.

In other aspects, an apparatus includes a cache memory, a CXL interface configured to receive transaction packets from a host system for access to the cache memory, storage media configured to store data of the host system, and a storage media controller configured to enable transfers of the data between the cache memory and the storage media. The apparatus also includes a telemetry unit operably coupled with the CXL interface and the storage media controller and an adaptive cache manager configured to obtain, from the telemetry unit, first telemetry information relating to the transaction packets received from the host system for access to the cache memory and second telemetry information relating to access of the storage media associated with the transaction packets and data present in the cache memory. The adaptive cache manager can determine a cache policy for the cache memory based on the first telemetry information and the second telemetry information and apply the cache policy to the cache memory to modify a caching scheme or a prefetching scheme for the data stored by the cache memory.

In yet other aspects, a System-on-Chip (SoC) includes a cache memory, a CXL interface configured to receive transaction packets from a host system for access to the cache memory, and a storage media controller with a storage media interface and configured to enable transfers of data between the cache memory and storage media coupled to the storage media interface. The SoC also includes a telemetry unit operably coupled with the cache memory and the storage media controller and an adaptive cache manager configured to receive, from the telemetry unit, first telemetry information relating to the transaction packets received from the host system and second telemetry information relating to access of the storage media associated with the transaction packets. The adaptive cache manager can determine a cache policy for the cache memory based on the first telemetry information and the second telemetry information and apply the cache policy to the cache memory to modify a caching scheme or a prefetching scheme for the data stored by the cache memory.

The details of one or more aspects of adaptive cache management for a storage media system are set forth in the accompanying drawings and the following description. Other features and advantages will be apparent from the description and drawings, and from the claims.

BRIEF DESCRIPTION OF THE DRAWINGS

The details of one or more aspects of adaptive cache management for a storage media system are set forth in the accompanying figures and the detailed description below. In the figures, the left-most digit of a reference number identifies the figure in which the reference number first appears. The use of the same reference numbers in different instances in the description and the figures may indicate like elements:

FIG. 2 illustrates an example computing system in which aspects of adaptive cache management can be implemented;

FIG. 5 depicts an example method for adaptive cache management in accordance with one or more aspects;

FIG. 6 depicts an example method for determining a cache policy based on parameters received from a host system in accordance with one or more aspects;

FIG. 7 depicts an example method for configuring a machine learning model based on telemetry information in accordance with one or more aspects;

DETAILED DESCRIPTION

Figure 1:
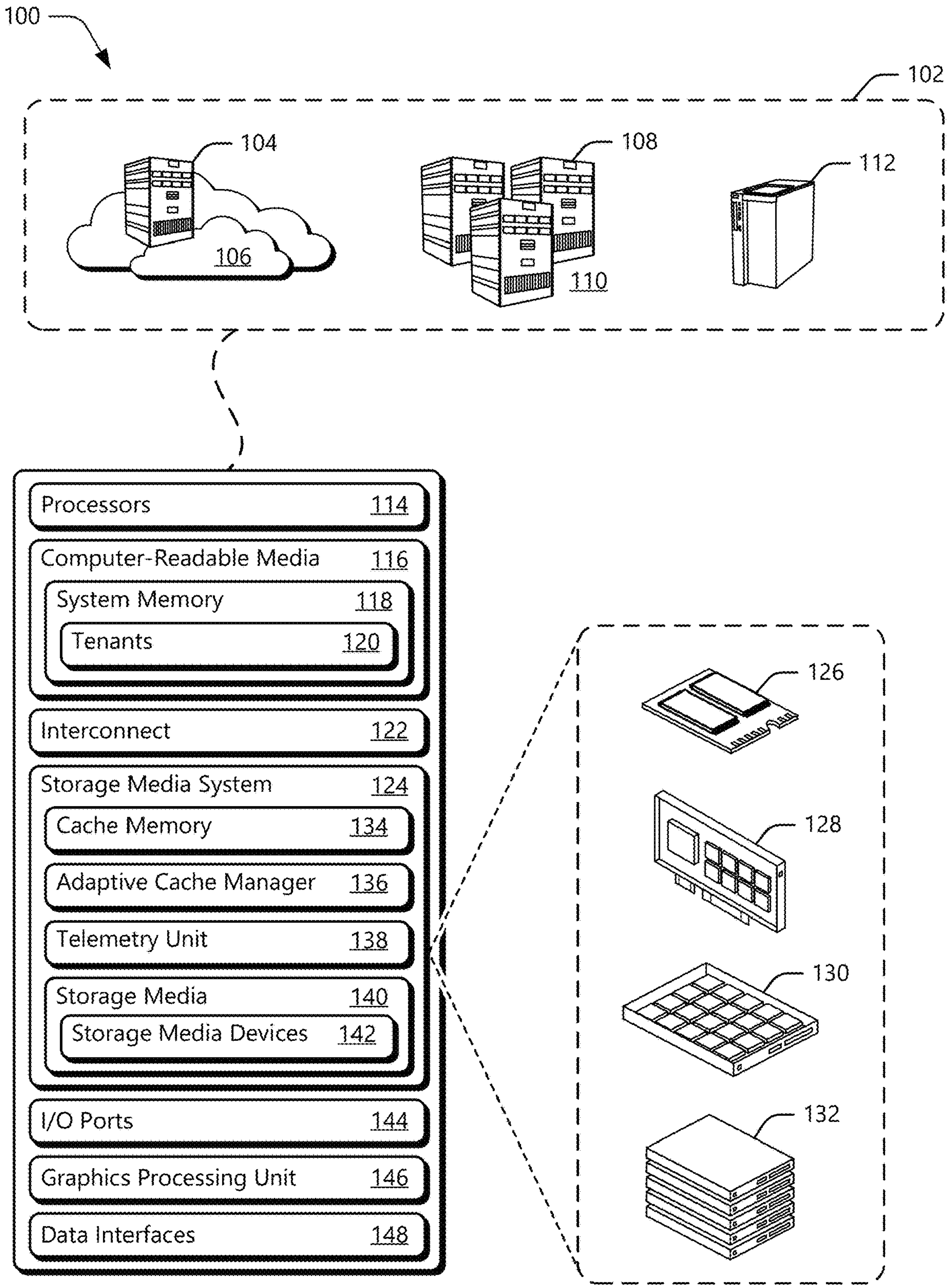
FIG. 1 illustrates an example operating environment having storage systems in which aspects of adaptive cache management can be implemented.

With modern applications, data and memory requirements have grown exponentially in recent years. For example, applications such as deep learning recommendation (DLRM) systems have large memory requirements due to data embeddings that capture complex relationships and patterns required for accurate predictions. In some cases, accelerator memory for artificial intelligence (AI) models that implement data embeddings for complex information spans over terabytes of data for improving the quality of recommendations. As such, replacing dynamic random-access memory (DRAM) with NAND Flash as working memory for these types of applications has been proposed to address the ever-increasing memory requirements. While storage density of NAND Flash is greater than DRAM memory, access latencies associated with conventional NAND Flash devices are significantly higher and generally not suitable for use as application working memory.

To reduce this high access latency, many NAND Flash drives include a smaller cache memory of DRAM to enable quicker retrieval of recently or frequently used data. For example, a NAND Flash drive may implement a caching mechanism to prevent eviction of frequently accessed data in a cache, allowing for quicker retrieval, and a prefetching mechanism to proactively fetch anticipated data before the data is requested. These conventional caching and prefetching mechanisms, however, are static in nature and preconfigured by a manufacturer of the NAND Flash drive. Generally, efficiency of caching mechanisms depends on different application characteristics, such as a size of accessed data, a frequency of updates, a ratio of read-to-write operations, data time to live, and the like.

Because these characteristics vary between applications and the caching mechanisms are static, a caching mechanism that works for one application may lead to poor performance for another application with distinct access requirements. Further, when application performance is impaired due to suboptimal cache configuration, these conventional mechanisms lack controls for updating or changing the cache configuration, which prevents a user making cache adjustments that may improve cache performance. Accordingly, conventional caching mechanisms are often static in configuration, offer suboptimal performance for most applications, and lack capabilities for adjusting to a wide variety of caching behavior associated with different applications, which can result in reduced application performance.

This disclosure describes apparatuses and techniques for adaptive cache management for a storage media system. In contrast with preceding caching mechanisms, the described apparatuses and techniques may implement aspects of adaptive cache management that capture telemetry information related to cache memory transactions and storage media access, which can be leveraged to determine or update a cache policy for the cache memory. Additionally, the described aspects may receive cache parameters or hints from an application or a user of a host system, and use those parameters or hints when determining cache policies. Further, the aspects may use the telemetry information with machine learning (ML) techniques to obtain ML-based cache parameters for use in configuring or updating the cache policy of the cache memory. By so doing, an adaptive cache manager may dynamically alter the caching and prefetch activities of the cache memory to improve efficiency of the cache memory.

In aspects, a storage media system can be implemented with a flexible or adaptive cache system that includes an adaptive cache manager to manage caching (e.g., adaptive compute unit), a telemetry unit to capture or obtain telemetry information within the storage media system, and a host system interface through which cache parameters can be received from an application or a user of the host system. The adaptive cache manager may support customizable caching and prefetching schemes, as well as enable updates to ML models of the system to increased caching efficiency. In other words, the adaptive cache manager can provide and tailor custom caching and prefetching mechanisms for specific application requirements. The telemetry unit can capture and provide different types of telemetry information (e.g., cache misses, cache hits, request size, logical block addresses (LBAs), data age, frequency of accesses to particular LBAs, etc.) to the adaptive cache manager for use in determining or adjusting cache policies. For example, the adaptive cache manager can leverage such information to configure custom caching and prefetching mechanisms to proactively fetch into and retain data in the cache, enhancing overall efficiency of the cache memory. The host system interface for caching parameters generally enables the adaptive cache manager to build collaborative (host-device) caching and prefetching mechanisms. This can be important as an application or user can provide application specific hints using application context, which the storage media system lacks. These are but a few example details of adaptive cache management, which may be described further and in combination with other aspects throughout this disclosure.

In various aspects, a storage media system includes a CXL interface to a host system, a cache memory, storage media, and an adaptive cache manager. The adaptive cache manager can obtain, from the telemetry unit, telemetry information relating to access of the cache memory and access of the storage media. Based on the telemetry information, the adaptive cache manager determines a cache policy for the cache memory and applies the cache policy to the cache memory to modify a caching scheme or a prefetching scheme for the data of the cache memory. In some cases, the adaptive cache manager receives caching parameters from an application or user of the host system and uses these parameters when determining the cache policy. Alternatively or additionally, the adaptive cache manager can provide the telemetry information to a machine learning model for processing. From machine learning model, the adaptive cache manager then receives ML-based cache parameters, which can also be used to determine the cache policy for the cache memory. By so doing, the adaptive cache manager may dynamically alter the caching and prefetch activities of the cache memory to improve efficiency of the cache memory.

The following discussion describes an operating environment, techniques that may be employed in the operating environment, a System-on-Chip (SoC), and various storage media controllers in which components of the operating environment may be embodied. In the context of the present disclosure, reference is made to the operating environment, techniques, or various components by way of example only.

Operating Environment

FIG. 1 illustrates an example operating environment 100 having host systems 102 (referred to as a single "host system 102") in which adaptive cache management may be implemented in accordance with one or more aspects. Generally, the host systems are capable of communicating, storing, or accessing various forms of data or information. Examples of the host system 102 may include a computing cluster 104 (e.g., of a cloud 106), a server 108 or server hardware of a data center 110, or a server 112 (e.g., standalone), any of which may be configured as part of a storage network, data center, or cloud system. Further examples of host system 102 (not shown) may include a laptop computer, a tablet computer, a desktop computer, a set-top-box, a data storage appliance, a wearable smart-device, a television, a content-streaming device, a high-definition multimedia interface (HDMI) media stick, a smart appliance, a home automation controller, a smart thermostat, an Internet-of-Things (IoT) device, a mobile-internet device (MID), a network-attached-storage (NAS) drive, an aggregate storage system, an aggregate memory system, a memory expander, a gaming console, an automotive computing system, and so on. Generally, a host system 102 may communicate or store data for any suitable purpose, such as to enable functionalities of a particular type of a device, an application, a virtual machine (VM), a tenant, cloud service, memory system, cache system, storage system, or the like.

The host system 102 includes processors 114 and computer-readable media 116. The processors 114 may be implemented as any suitable type or number of processors (e.g., x86 or ARM), either single-core or multi-core, for executing instructions or commands of an operating system, an application, a tenant, a VM, or other software executing on the host system 102. The computer-readable media 116 (CRM 116) includes system memory 118 from which tenants 120, VMs, or applications (not shown) of a host system 102 may be executed or implemented. The system memory 118 of the host system 102 may include any suitable type or combination of volatile memory or nonvolatile memory. For example, the volatile memory of host systems 102 may include various types of random-access memory (RAM), dynamic RAM (DRAM), static RAM (SRAM) or the like. The non-volatile memory may include read-only memory (ROM), electronically erasable programmable ROM (EEPROM) or Flash memory (e.g., NOR Flash or NAND Flash). These memories, individually or in combination, may store data associated with applications, tenants, workloads, initiators, VMs, and/or an operating system of the host system 102.

In this example, the host system 102 includes an interconnect 122 and a storage media system 124, which may be accessed through the interconnect 122 using any suitable protocol. In some implementations, the interconnect 122 is configured as a compute express link (CXL) interconnect over a peripheral component interconnect express (PCIe) interface. Thus, the host system 102 and storage media system 124 may communicate using transaction packets or "flits" compliant with a CXL input/output (CXL.io) protocol, CXL memory (CXL.mem) protocol, or any other suitable CXL protocol. In aspects, the host system 102 issues load and/or store to the storage media system 124 over the interconnect 122 as CXL.mem transactions packets to access the storage media system as a working memory for tenants, applications, or VMs executing on the host system.

The storage media system 124 may be configured as any suitable type of data storage system, such as a storage device, a storage drive, a storage array, a storage volume, a data storage center, or the like. Although described with reference to the host system 102, the storage media system 124 may also be implemented separately as a standalone device or as part of a larger storage collective, such as a network-attached storage device, external storage drive, data storage center, server farm, or virtualized storage system (e.g., for cloud-based storage, applications, or services). Examples of the storage media system 124 include a non-volatile memory express (NVMe) solid-state drive 126, a peripheral component interconnect express (PCIe) solid-state drive 128, a solid-state drive 130 (SSD 130), and a storage array 132, which may be implemented as CXL-enabled devices (e.g., a CXL.mem-enabled SSD) and/or with any combination of storage devices or storage drives.

In this example, the storage media system 124 includes a storage media controller (not shown), a cache memory 134, an adaptive cache manager 136, a telemetry unit 138, storage media 140 of storage media device 142 (e.g., NAND dies or devices). As described with reference to FIGS. 2-4, the storage media controller manages various operations or functionalities of the storage media system 124. The cache memory 134 of the storage media system 124 may include or be formed from any suitable type of volatile memory devices, such as RAM devices, DRAM devices, or the like. The storage media 140 may include or be formed from non-volatile memory devices on which data or information of the host system 102 is stored. The storage media 140 may be implemented with any type or combination of solid-state memory media, such as Flash, NAND Flash, SRAM, or the like. For example, the storage media 140 of the storage media system 124 may include NAND Flash memory, single-level cell (SLC) Flash memory, multi-level cell (MLC) Flash memory, triple-level cell (TLC) Flash, quad-level cell Flash (QLC), NOR cell Flash, or any combination thereof. These memories, individually or in combination, may store data associated with a user, applications, tenant, workload, service, and/or an operating system of host system 102.

In aspects, the host system 102 or applications executing on the host system may use the storage media system 124 as a working memory and access data stored by the storage media system 124 through CXL.mem transaction requests. The telemetry unit 138 may be operably coupled with a host interface, the cache memory 134, and/or the storage media controller of the storage media system to capture or collect telemetry information relating to the access of the storage media system. Generally, the adaptive cache manager 136 may obtain the telemetry information or statistics relating to access to the cache memory 134 and/or the storage media 140 that are indicative of an efficiency or performance of the cache memory 134. For example, when data of a load request from the host system 102 is present in the cache memory 134, the cache memory 134 can return the data as a "cache hit" and telemetry information from the cache memory may reflect the cache hit. Alternatively, when the data of a load request is not present in the cache memory 134, the storage media controller fetches the data from the storage media as a "cache miss" and the telemetry information may reflect the cache miss.

Based on this or other telemetry information, the adaptive cache manager 136 can select, determine, or configure a cache policy for the cache memory 134 and apply the cache policy to the cache memory 134 to modify a caching scheme or a prefetching scheme for the data of the cache memory. Example caching and/or prefetching policies selected or configured by the adaptive cache manager 136 may include a randomized policy, first-in, first-out (FIFO) policy, a list-in, first-out (LIFO) policy, least recently used (LRU), most recently used (MRU), least frequently used (LFU), most frequently used (MFU), sized-based policy, retrieval cost-based policy, identification based policy (e.g., hash or bloom filter), hop-count, quality-of-service (QOS) priority, or the like. In some cases, the adaptive cache manager 136 receives caching parameters from an application or user of the host system 102 and uses these parameters when selecting, determining, or configuring the cache policy. Alternatively or additionally, the adaptive cache manager 136 can provide the telemetry information to a machine learning (ML) model or neural network (NN) for processing. From the ML model or NN, the adaptive cache manager 136 may receive ML-based or NN-based cache parameters, which can also be used to determine the cache policy for the cache memory. By so doing, the adaptive cache manager 136 may reduce latency, improve cache memory efficiency (e.g., increase as cache hit/miss ratio), and improve working memory performance of an application. These are but a few examples of adaptive cache management, which are described in detail throughout the disclosure.

Returning to FIG. 1, the host system 102 may also include I/O ports 144, a graphics processing unit 146 (GPU), and data interfaces 148. Generally, the I/O ports 144 allow a host system 102 to interact with other devices, peripherals, or users. For example, the I/O ports 144 may include or be coupled with a universal serial bus, human interface devices, audio inputs, audio outputs, or the like. The GPU 146 processes and renders graphics-related data for host system 102, such as user interface elements of an operating system, applications, or the like. In some cases, the GPU 146 accesses a portion of local memory to render graphics or includes dedicated memory for rendering graphics (e.g., video RAM) of the host system 102.

The data interfaces 148 of the host system 102 provide connectivity to one or more networks and other devices connected to those networks. The data interfaces 148 may include wired interfaces, such as Ethernet or fiber optic interfaces for communicated over a local network, intranet, or the Internet. Alternately or additionally, the data interfaces 148 may include wireless interfaces that facilitate communication over wireless networks, such as wireless LANs, wide-area wireless networks (e.g., cellular networks), and/or wireless personal-area-networks (WPANs). Any of the data communicated through the I/O ports 144 or the data interfaces 148 may be written to or read from the storage media system 124 of the host system 102 in accordance with one or more aspects of this disclosure.

FIG. 2 illustrates at 200 an example computing system with a host 202 and a storage media system 124 with an adaptive cache manager 136 implemented in accordance with one or more aspects. The computing system 200 may represent an example configuration of the host system 102, storage media system 124, and adaptive cache manager 136 as described with reference to FIG. 1. A host 202 and compute resources 204 may be implemented similarly to or differently the host system 102 and processors 114 of FIG. 1 and may represent a single host executing on a processor, several hosts executing on respective processors, multiple hosts executing on a pool of processing resources, and so forth. In this example, the storage media system 124 is implemented as an array of multiple SSDs 130-1 through **130-*m* (collectively SSDs 130) coupled to the host 202 through the interconnect 122 (e.g., a CXL interconnect). As shown, each SSD 130 may include an instance of a storage media controller 206-1 through 206-*m* in which a cache memory 134, adaptive cache manager 136, and telemetry unit 138 may be embodied. The SSDs 130 also includes storage media 140 formed from multiple channels 208-1 through 208-4** of NAND memory devices.

In aspects, the host 202 (e.g., a host system 102) may include multiple tenants 120-0 through **120-*n* that execute on the compute resources 204 of the host. Generally, the compute resources 204 of the host 202 may include combinations of processing resources and system memory of the host 202 which are used to implement the tenants, applications, virtual machines, or initiators that access memory or storage associated with the host 202. As such, although shown as a singular host, the host 202 may represent multiple hosts, applications, virtual machines, guests, tenants, and/or initiators that can issue commands or requests to access (e.g., as a working memory) the data stored by the cache memory or storage media of the SSDs 130 of the storage media system 124**.

Generally, applications of the tenants 120 or the host 202, can use the cache memory 134 and/or the storage media 140 as a working memory or host-managed device memory space (HDM). In aspects, the host 202 or tenants 120 of the host issue transaction packets, such as load or store commands, to a respective storage media controller 206 to write data to or read data from the storage presented by the storage media controller 206. These commands or requests may be received and processed by the storage media controller 206 or a cache controller (not shown), which may issue corresponding commands or requests to the cache memory 134 or the storage media 140 to service the data load or data store operations received from the host 202. The telemetry unit 138 may be operably coupled with the interconnect 122, storage media controller 206, a CXL endpoint, and/or the cache memory 134 of the SSD 130 to capture or collect telemetry information relating to the access of the SSD.

In aspects, the adaptive cache manager 136 obtains, from the telemetry unit 138, the telemetry information or statistics relating to access to the cache memory 134 and/or the storage media 140 that are indicative of an efficiency or performance of the cache memory 134. For example, the adaptive cache manager 136 may be able to determine a hit/miss ratio, a latency, a hit rate, a byte hit rate, a miss rate, or access time for the cache memory 134. Based on the telemetry information, the adaptive cache manager 136 can determine a cache policy for the cache memory 134 and apply the cache policy to the cache memory 134 to modify a caching scheme or a prefetching scheme for the data of the cache memory. By so doing, the adaptive cache manager 136 may reduce latency, improve cache memory efficiency (e.g., increase as cache hit/miss ratio), and improve working memory performance of an application.

Figure 3:
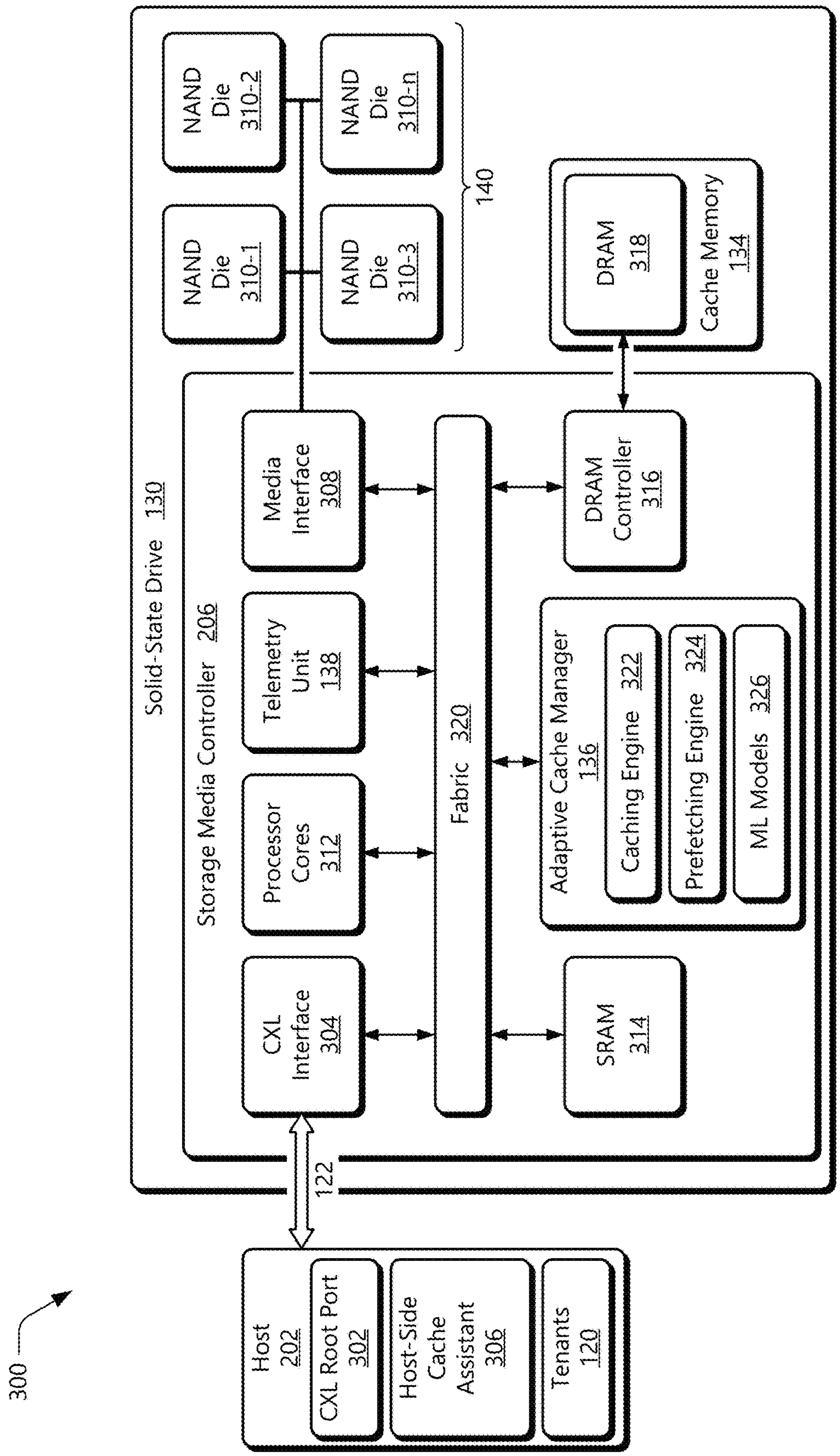
FIG. 3 illustrates an example storage media controller with an adaptive cache manager implemented in accordance with one or more aspects.

FIG. 3 illustrates at 300 an example configuration of a storage media controller 206 with an adaptive cache manager 136 implemented in accordance with one or more aspects. In this example, the adaptive cache manager 136 and storage media controller 206 are illustrated in the context of a storage media system implemented as an SSD 130. The adaptive cache manager 136 may interact with the host system 102 and/or components of the storage media controller 206 to implement aspects of adaptive cache management for a storage media system. In this example, the host 202 includes a CXL root port 302 that communicates transaction packets with a CXL interface 304 (e.g., CXL end point or CXL controller) of the storage media controller 206. The host 202 also includes a host-side cache assistant 306 (cache assistant 306) and one or more tenants 120, which execute applications on the host. The cache assistant 306 may be configured as an application programming interface or user interface by which an application or user of the host system can provide caching parameters or cache hints to the adaptive cache manager 136. In aspects, the caching parameters or hints may include a data access pattern or behavior of the application, an optimal type of cache policy for an application, threshold settings relating to caching parameters, or the like.

Generally, operations of the SSD 130 are enabled or managed by an instance of the storage media controller 206, which in this example includes the CXL interface 304 to enable communication with the host 202 and a media interface 308 to enable access to the storage media 140. As shown in FIG. 3, the storage media 140 may include multiple NAND Flash dies 310-1 through **310-*n*, where n is any suitable integer. In some cases, the NAND dies 310 form a NAND device that includes multiple Flash channels of memory devices, dies, or chips that may be accessible or managed on a channel-level (group of dies), device-level (individual dies), or block-level (individual blocks or pages of storage media cells). Although described as a CXL root port 302, a host interface of the storage media controller 206 may be configured to implement any suitable type of storage interface or protocol, such as serial advanced technology attachment (SATA), universal serial bus (USB), PCIe, advanced host controller interface (AHCI), NVMe, NVM-over Fabric (NVM-OF), NVM host controller interface specification (NVMHCIS), small computer system interface (SCSI), serial attached SCSI (SAS), secure digital I/O (SDIO), Fibre channel, any combination thereof (e.g., an M.2 or next generation form-factor (NGFF) combined interface), or the like. Alternately or additionally, the media interface 308** may implement any suitable type of storage media interface, such as a Flash interface, Flash bus channel interface, NAND channel interface, physical page addressing (PPA) interface, or the like.

The components of the storage media controller 206 can provide a data path between the CXL root port 302, cache memory 134, and the media interface 308 to the storage media 140. In other words, the storage media controller can be configured to enable transfers of the data between the cache memory and the storage media, such as for storing data to the storage media when evicted from the cache memory or fetching data from the storage media to the cache memory to serve a cache miss. In this example, the storage media controller 206 includes processor cores 312 for executing a kernel, firmware, or a driver to implement functions of the storage media controller 206, which may include a Flash translation layer (FTL) for generating media access I/Os based on host access I/Os for data access (e.g., in response to cache misses). In some cases, the processor cores 312 may also execute processor-executable instructions to implement the adaptive cache manager 136 of the storage media controller 206. Alternately or additionally, the adaptive cache manager 136 may execute from or run on cache-specific hardware or separate processor core. A static random-access memory 314 (SRAM 314) of the storage media controller 206 may store processor-executable instructions or code for firmware or drivers of the storage media controller, which may be executed by the processor cores 312. The storage media controller 206 may also include a dynamic random-access memory (DRAM) controller 316 and associated DRAM 318 of the cache memory 134. In aspects, the storage media controller 206 stores or caches data to the DRAM 318 as the controller moves data between the CXL interface 304, storage media 140, or other components of the storage media controller.

As shown in FIG. 3, a fabric 320 of the storage media controller 126, which may include control and data buses, operably couples and enables communication between the components of the storage media controller 206. For example, the adaptive cache manager 136 or telemetry unit 138 may communicate with the host 202, CXL interface 304, media interface 308, processor cores 312 (e.g., firmware), an SRAM 314, a DRAM 318 to exchange data, information, transactions, or I/Os within the storage media controller 206. In aspects, the telemetry unit 138 may obtain or capture telemetry information from the CXL interface 304, media interface 308, or the storage controller firmware relating to access of the cache memory 134 and/or the storage media 140 for data of an application, which may be configured to use the SSD 130 as a working memory. The adaptive cache manager 136 may receive the telemetry information from the telemetry unit, as well as ML-based cache parameters and/or host-based cache parameters, and determine, based on at least the telemetry information, a cache policy for the cache memory 134.

In aspects, the adaptive cache manager 136 may configure or adjust the caching engine 322 or the prefetching engine 324 based on the determined cache policy. In some cases, the cache policy includes a selection of a cache policy type or configuration parameters for the cache policy. Alternatively or additionally, the adaptive cache manager 136 may provide the telemetry information to an ML model or neural network to obtain ML-based cache parameters by which to configure or adjust the caching engine 322 or the prefetching engine 324. By so doing, the adaptive cache manager may dynamically alter the caching and prefetch activities of the cache memory to improve efficiency of the cache memory.

Figure 4:
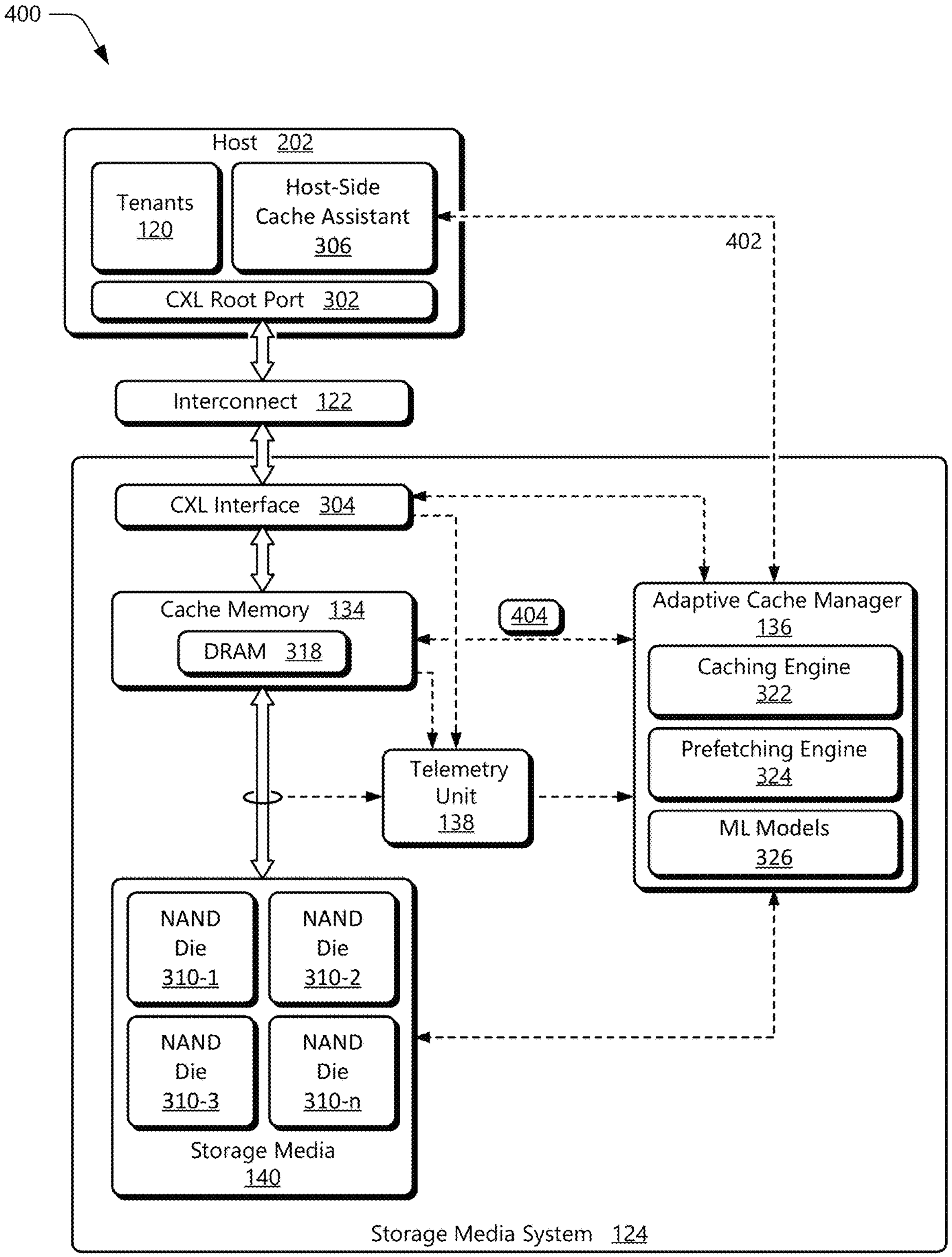
FIG. 4 illustrates an example implementation of an adaptive cache manager in accordance with one or more aspects.

FIG. 4 illustrates at 400 an example implementation of an adaptive cache manager in accordance with one or more aspects. In this example, the adaptive cache manager 136 is implemented in a CXL-enabled storage media system 124 that is operably coupled with a host 202 via an interconnect 122. The storage media system 124 may be configured similarly to or differently from the SSD 130 as described with reference to FIG. 3. The host 202 includes tenants 120 or applications (not shown) that execute on compute resources of the host, a CXL root port 302, and a host-side cache assistant 306. As shown in FIG. 4, the cache assistant 306 and the adaptive cache manager 136 may communicate via a side channel 402 or through the CXL interface 304 of the storage media system 124.

In aspects, the telemetry unit 138 captures telemetry information relating to access of the cache memory 134 and/or the storage media 140 responsive to transaction packets communicated between the host 202 and the storage media system 124. In some cases, the telemetry unit 138 captures first telemetry information relating to access of the storage media device as a memory, which may include CXL.mem transaction packets or flits to load data or store data associated with an application executing on the host. For example, the first telemetry information may include a cache hit, a request size to the cache, a cache byte address, a cache line address, an age of data of a cache line, or frequency of access to a cache line. The first telemetry information may relate specifically to access of the cache memory 134, such as cache hits in which data is returned to the host 202 without fetching the data from the storage media 140. Alternatively or additionally, the telemetry unit 138 can capture second telemetry information relating to access of the storage media 140, such as a cache miss, a request size to the storage media, an LBA of data requested, an age of data at an LBA, or frequency of access to an LBA. In other words, the second telemetry information may indicate activity related to fetching data from the storage media for cache misses when requested data is not present in the cache memory 134. Alternatively or additionally, the telemetry unit 138 maintains or records time-series data, which may include a history of data accesses to cache memory 134 and storage media 140. This time-series data can be used by Machine Learning models, such as LSTMs (Long short-term memory (LSTM) network, a type of recurrent neural network (RNN)) to initiate prefetching or cache eviction instructions.

In aspects, the adaptive cache manager 136 determines, selects, or modifies a cache policy 404 of the cache memory 134 based on the first telemetry information and the second telemetry information. In some implementations, the adaptive cache manager 136 determines metrics for cache memory performance or efficiency based on the first telemetry information and the second telemetry information. For example, using the telemetry information or information provided by the storage media controller 206, the adaptive cache manager 136 can determine a cache hit rate, a cache byte hit rate, a cache miss rate, cache latency, or cache access time. In some cases, the adaptive cache manager 136 monitors or tracks a metric over time and compares the metric to a threshold, which may be configured to trigger updating of the cache policy 404 or retraining of an ML model when cache efficiency falls below the threshold.

As shown in FIG. 4, the adaptive cache manager 136 may include or have access to multiple ML models 326 and/or neural networks that are configured or trained to assist with or optimize cache policies 404 or caching schemes applied to the cache memory 134. The ML models 326 or neural networks may be stored in a persistent storage media of the storage system, such as the storage media 140, an internal memory of the storage controller 206 (not shown), or memory of the adaptive cache manager 136. In this example, the ML models 326 are embodied as part of the adaptive cache manager 136, which is illustrated as also implementing the caching engine 322 and prefetching engine 324. The ML models 326 may include any suitable number of ML models, AI models, or neural networks, which may be configured differently from or similarly to one another.

Various aspects of adaptive cache management may be implemented by the adaptive cache manager 136 that interacts with the ML models 326, neural networks, or any suitable AI engine, AI model, or AI driver of or associated with a storage media controller, cache memory, or data caching component. For example, the adaptive cache manager 136 can configure an ML machine learning model using the first telemetry information and/or the second telemetry information and then use outputs provided by the ML model to determine, select, and/or configure the cache policy 404 for the cache memory. In some cases, adaptive cache manager 136 configures the ML model by training or retraining the ML model based on the first telemetry information and/or the second telemetry information. Alternatively or additionally, the adaptive cache manager 136 may be configured to perform or initiate retraining of the ML model in response to a duration of time lapsing or when metric of the cache memory falls below a performance threshold of the cache memory. With respect to processing various features of cache memory activity and/or cache memory policies and settings (e.g., the first and/or second telemetry information), one or more of the ML models 326 may be implemented with machine-learning that is based on one or more neural networks (e.g., pre-trained, live-trained, or dynamically retrained) to implement the aspects or techniques described herein, such as selecting a cache policy, selecting a prefetch policy, or configuring respective settings of either type of policy. Any ML model, neural network, AI model, ML algorithm, or the like of the adaptive cache controller 136 may include a group of connected nodes, such as neurons or perceptrons, which are organized into one or more layers.

Generally, an instance of an ML model 326 associated with the adaptive cache manager 136 may be implemented with a deep neural network (DNN) that includes an input layer, an output layer, and one or more hidden intermediate layers positioned between the input layer, pre-input layer (e.g., embedding and/or averaging network), and the output layers of the neural network. Each node of the deep neural network may in turn be fully connected or partially connected between the layers of the neural network. An ML model or neural network may be any deep neural network (DNN), such as a convolutional neural network (CNN) including one of AlexNet, ResNet, GoogleNet, MobileNet, or the like. Alternatively or additionally, an ML model or neural network may be implemented as or include any suitable recurrent neural network (RNN) or any variation thereof. Generally, an ML model 326, neural network, ML algorithm, or AI model employed by the adaptive cache controller 136 may also include any other supervised learning, unsupervised learning, reinforcement learning algorithm, or the like.

Techniques for Adaptive Cache Management

The following discussion describes techniques for adaptive cache management in accordance with various aspects. These techniques may be implemented using any of the environments and entities described herein, such as the adaptive cache manager 136, telemetry unit 138, caching engine 322, prefetching engine 324, and/or ML models 326. These techniques include various methods illustrated in FIGS. 5-7, each of which is shown as a set of operations that may be performed by one or more entities of a storage media controller. The described operations of the methods may be performed using any suitable circuitry or component, such as the adaptive cache manager 136, telemetry unit 138, caching engine 322, prefetching engine 324, and/or ML models 326, which may provide means for implementing one or more of the operations described with reference to the methods of FIGS. 5-7.

These methods are not necessarily limited to the orders of operations shown in the associated figures. Rather, any of the operations may be repeated, skipped, substituted, or re-ordered to implement various aspects described herein. Further, these methods may be used in conjunction with one another, in whole or in part, whether performed by the same entity, separate entities, or any combination thereof. For example, the methods may be combined to implement adaptive cache management to set or alter parameters of a cache policy for a cache memory based on telemetry information, user input, and/or ML-based parameters to improve caching efficiency of the cache memory. In portions of the following discussion, reference will be made to the operating environment 100 of FIG. 1 and various entities, configurations, or components of FIGS. 2-4 by way of example. Such reference is not to be taken as limiting described aspects to the operating environment 100, storage controllers, entities, algorithms, or configurations, but rather as illustrative of one of a variety of examples. Alternatively or additionally, operations of the methods may also be implemented by or with entities described with reference to the SoC of FIG. 8 or the storage media controller of FIG. 9.

FIG. 5 depicts an example method 500 for adaptive cache management in accordance with one or more aspects. The operations of the method 500 may be implemented by an adaptive cache manager 136, telemetry unit 138, caching engine 322, prefetching engine 324, and/or ML models 326 of a media controller.

At 502, an adaptive cache manager receives, from a host system and via a CXL interface, transaction packets for access to data of a cache memory of a storage media system. The transaction packets received from the host system may be compliant or formatted in accordance with a CXL memory protocol or a CXL cache protocol. When the storage media system is configured as a working memory for an application of the host system, the transaction packets may include a load instruction to load data from the cache memory (or storage media) or a store instruction to store data to the cache memory (or storage media).

At 504, the adaptive cache manager determines first telemetry information relating to the transaction packets for access to the cache memory of the storage media system. The first telemetry information may include one or more of a cache hit, a request size to the cache, a cache byte address, a cache line address, an age of data of a cache line, or frequency of access to a cache line. At 506, the adaptive cache manager determines second telemetry information relating to access of storage media of the storage media system associated with the transaction packets. The second telemetry information may include one or more of a cache miss, a request size to the storage media, an LBA, an age of data at an LBA, or frequency of access to an LBA.

At 508, the adaptive cache manager determines a cache policy for the cache memory based on the first telemetry information and the second telemetry information. This may include selecting cache policy or configuring a cache policy to apply to the cache memory or a controller of the cache memory. In some cases, the adaptive cache manager determines metrics for the cache memory based on the first telemetry information and the second telemetry information, and then determines the cache policy for the cache memory based on the metrics of the cache memory. These metrics may include a cache hit rate, a cache byte hit rate, a cache miss rate, cache latency, or cache access time.

At 510, the adaptive cache manager applies the cache policy to the cache memory to modify a caching scheme or prefetching scheme for the data of the cache memory. In some cases, the cache policy applied to the cache memory alters the caching scheme or the prefetching scheme of the cache memory. Alternatively or additionally, the adaptive cache manager adjust settings or configures a caching engine or a prefetching engine associated with the cache memory. In some implementations, the operations of the method 500 may be performed iteratively (e.g., at predetermined or random intervals) to optimize settings of the cache memory (e.g., increase a hit/miss ratio). By so doing, the adaptive cache manager may dynamically alter the caching and prefetch activities of the cache memory to improve efficiency of the cache memory.

FIG. 6 depicts an example method 600 for allocation of stream transaction requests in accordance with various aspects. The operations of the method 600 may be implemented by an adaptive cache manager 136, telemetry unit 138, caching engine 322, prefetching engine 324, and/or ML models 326 of a media controller.

At 602, the adaptive cache manager of a storage media system receives cache parameters from a host system. The cache parameters may be received via a host system interface for a user or an application executing on the host. Generally, the host-provided cache parameters may enable the adaptive cache manager to build collaborative (host-device) caching and prefetching mechanisms. This can be important as an application or user can provide application specific hints using application context, which the storage media system lacks.

At 604, the adaptive cache manager receives, from the host system and via a CXL interface, transaction packets for access to data of a cache memory of the storage media system. The transaction packets received from the host system may be compliant or formatted in accordance with a CXL memory protocol or a CXL cache protocol. When the storage media system is configured as a working memory for an application of the host system, the transaction packets may include a load instruction to load data from the cache memory (or storage media) or a store instruction to store data to the cache memory (or storage media).

At 606, the adaptive cache manager obtains telemetry information relating to the transaction packets for access to the cache memory and access to storage media of the storage media system. The telemetry information may include or indicate cache memory access, such as a cache hit, a request size to the cache, a cache byte address, a cache line address, an age of data of a cache line, or frequency of access to a cache line. Alternatively or additionally, the telemetry information may indicate or relating to access of storage media of the storage media system, such as a cache miss, a request size to the storage media, an LBA, an age of data at an LBA, or frequency of access to an LBA.

At 608, the adaptive cache manager determines a cache policy for the cache memory based on the telemetry information and the cache parameters received from the host system. This may include selecting cache policy or configuring a cache policy to apply to the cache memory or a controller of the cache memory. In some cases, the adaptive cache manager determines metrics for the cache memory based on the first telemetry information and the second telemetry information, and then determines the cache policy for the cache memory based on the metrics of the cache memory. These metrics may include a cache hit rate, a cache byte hit rate, a cache miss rate, cache latency, or cache access time.

Optionally at 610, the adaptive cache manager applies the cache policy to a caching engine of the cache memory. The application of the caching policy may alter or set the caching engine to implement a different type of cache policy or a same cache policy with different settings for holding or evicting data from the cache memory. Optionally at 612, the adaptive cache manager applies the cache policy to a prefetching engine of the cache memory. The application of the caching policy may alter or set the prefetching engine to implement a different type of prefetching scheme or a same prefetching scheme with different settings for anticipating host access and/or prefetching cache lines of data from the storage media.

FIG. 7 depicts an example method 700 for managing stream transactions to balance bandwidth utilization in accordance various. The operations of the method 700 may be implemented by an adaptive cache manager 136, telemetry unit 138, caching engine 322, prefetching engine 324, and/or ML models 326 of a media controller.

At 702, an adaptive cache manager receives, from a host system and via a CXL interface, transaction packets for access to data of a cache memory of a storage media system. The transaction packets received from the host system may be compliant or formatted in accordance with a CXL memory protocol or a CXL cache protocol. When the storage media system is configured as a working memory for an application of the host system, the transaction packets may include a load instruction to load data from the cache memory (or storage media) or a store instruction to store data to the cache memory (or storage media).

At 704, the adaptive cache manager obtains telemetry information relating to the transaction packets for access to the cache memory and access to storage media of the storage media system. The telemetry information may include or indicate cache memory access, such as a cache hit, a request size to the cache, a cache byte address, a cache line address, an age of data of a cache line, or frequency of access to a cache line. Alternatively or additionally, the telemetry information may indicate or relating to access of storage media of the storage media system, such as a cache miss, a request size to the storage media, an LBA, an age of data at an LBA, or frequency of access to an LBA.

At 706, the adaptive cache manager provides the telemetry information to a machine learning model. In some cases, the adaptive cache manager adjusts settings, weightings, and/or layers of a neural network through which the machine learning model is implemented. Generally, the telemetry information may relate to or indicate characteristics of access related to cache memory access (e.g., cache hits) and/or access to the storage media (e.g., cache misses) generated in response to transaction packets issued by the host to load or store data of an application.

At 708, the adaptive cache manager receives ML-based cache parameters from the machine learning model based on the telemetry information. The ML-based cache parameters may indicate a selection of a cache policy or settings for a cache policy based on the telemetry information. Generally, the ML-based parameters provided by the ML model may be optimized based on the telemetry information, such that cache memory efficiency may be increased when determining an updated cache policy or cache policy settings.

At 710, the adaptive cache manager determines a cache policy for the cache memory using the ML-based cache parameters received from the machine learning model. This may include selecting cache policy or configuring a cache policy to apply to the cache memory or a controller of the cache memory. In some cases, the adaptive cache manager determines metrics for the cache memory based on the first telemetry information and the second telemetry information, and then determines the cache policy for the cache memory based on the metrics of the cache memory. These metrics may include a cache hit rate, a cache byte hit rate, a cache miss rate, cache latency, or cache access time.

At 712, the adaptive cache manager applies the cache policy to the cache memory to modify a caching scheme or prefetching scheme for the data of the cache memory. In some cases, the cache policy applied to the cache memory alters the caching scheme or the prefetching scheme of the cache memory. Alternatively or additionally, the adaptive cache manager adjust settings or configures a caching engine or a prefetching engine associated with the cache memory. In some implementations, the operations of the method 500 may be performed iteratively (e.g., at predetermined or random intervals) to optimize settings of the cache memory (e.g., increase a hit/miss ratio). By so doing, the adaptive cache manager may dynamically alter the caching and prefetch activities of the cache memory to improve efficiency of the cache memory.

System-on-Chip and Controller

Figure 8:
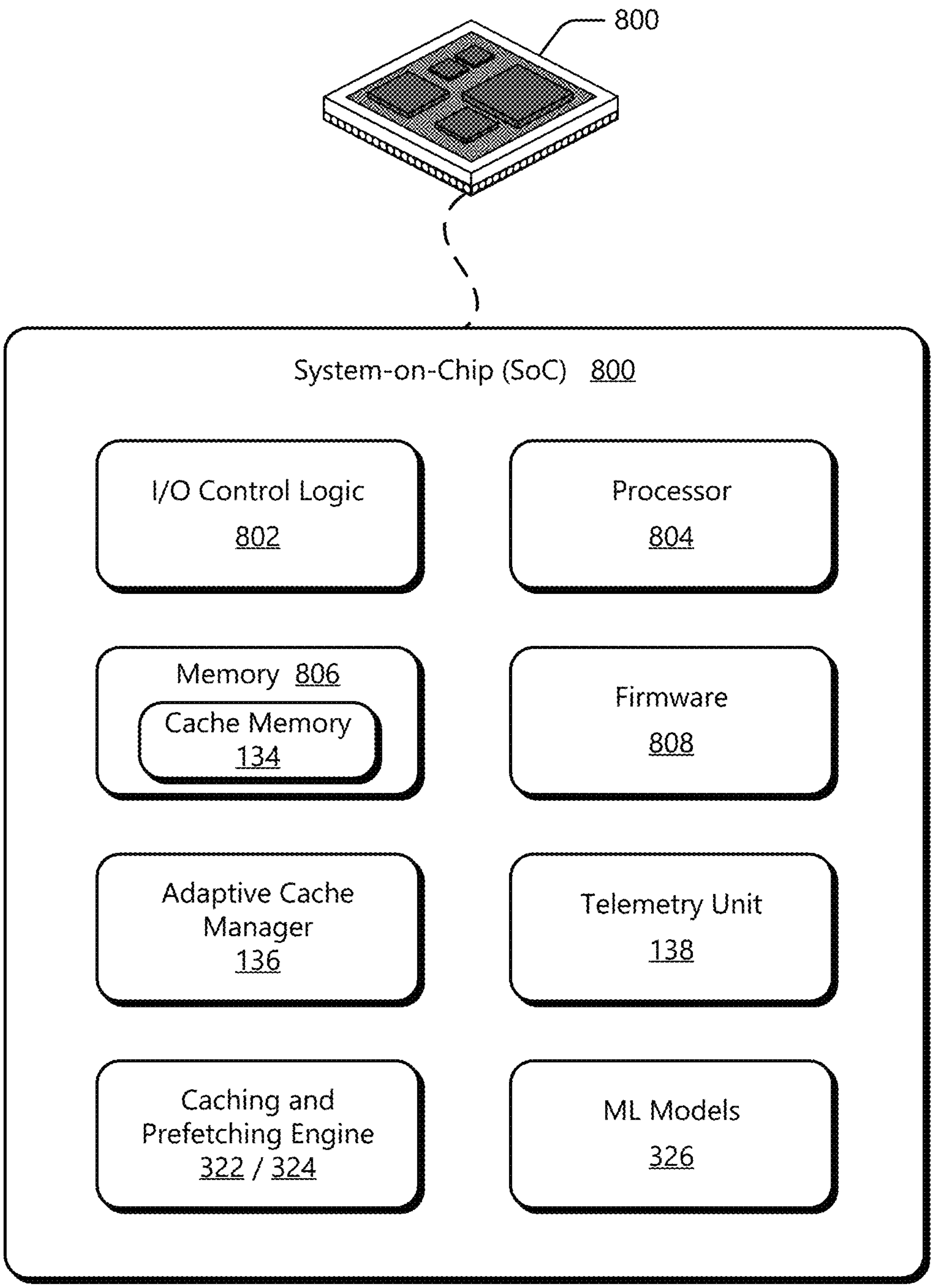
FIG. 8 illustrates an example System-on-Chip (SoC) environment in which aspects of adaptive cache management may be implemented.

FIG. 8 illustrates an example System-on-Chip (SoC) 800 environment in which various aspects of adaptive cache management for a storage media system may be implemented. The SoC 800 may be implemented in any suitable system or device, such as a storage device, a memory device, a router, a wireless access point, a smart-phone, a netbook, a tablet computer, an access point, a network-attached storage, a camera, a smart appliance, a printer, a set-top box, a server, a data storage center, a solid-state drive (SSD), a hard disk drive (HDD), a storage drive array, a memory module, an automotive computing system, an aggregate storage controller, an aggregate memory controller, or any other suitable type of device (e.g., others described herein). Although described with reference to a SoC, the entities of FIG. 8 may also be implemented as other types of integrated circuits or embedded systems, such as an application-specific integrated-circuit (ASIC), a memory controller, a storage controller, a communication controller, an application-specific standard product (ASSP), a digital signal processor (DSP), a programmable SoC (PSoC), a system-in-package (SiP), or a field-programmable gate array (FPGA).

The SoC 800 may be integrated with electronic circuitry, a microprocessor, memory, input-output (I/O) control logic, media interface, host interface, firmware, and/or software useful to provide functionalities of a computing device, a host system, a memory system, or a storage system, such as any of the devices or components described herein (e.g., storage controller, memory controller, CXL cache controller). The SoC 800 may also include an integrated data bus or interconnect fabric (not shown) that couples the various components of the SoC for control signaling, data communication, and/or routing between the components. The integrated data bus, interconnect fabric, or other components of the SoC 800 may be exposed or accessed through an external port, a parallel data interface, a serial data interface, a fabric-based interface, a peripheral component interface (e.g., PCIe-based interface), or any other suitable data interface. For example, the components of the SoC 800 may access or control external storage media, external memory, processing blocks, network interfaces, or neural networks, through an external interface or off-chip data interface.

In this example, the SoC 800 includes various components such as input-output (I/O) control logic 802 and a hardware-based processor 804 (processor 804), such as a microprocessor, a processor core, an application processor, a DSP, an ASIC, or the like. The SoC 800 also includes memory 806, which may include any type and/or combination of RAM, SRAM, DRAM, non-volatile memory, ROM, one-time programmable (OTP) memory, multiple-time programmable (MTP) memory, Flash memory, and/or other suitable electronic data storage. In this example, the memory 806 includes an instance of a cache memory 134, which may include a cache of volatile memory (e.g., RAM or DRAM). In some aspects, the processor 804 and code stored on the memory 806 are implemented as a storage controller, cache controller, or memory controller to provide various functionalities associated with adaptive cache management. In the context of this disclosure, the memory 806 stores data, code, instructions, or other information via non-transitory signals, and does not include carrier waves or transitory signals. Alternatively or additionally, the SoC 800 may comprise a data interface (not shown) for accessing additional or expandable off-chip media, such as solid-state memory (e.g., Flash or NAND memory), memory media (e.g., DRAM modules or dies), magnetic-based memory media, or optical-based memory media.

The SoC 800 may also include firmware 808, applications, programs, software, and/or an operating system, which may be embodied as processor-executable instructions maintained on the memory 806 for execution by the processor 804 to implement functionalities of the SoC 800. The SoC 800 may also include other communication interfaces, such as a transceiver interface for controlling or communicating with components of a local on-chip (not shown) or off-chip communication transceiver. Thus, in some aspects, the SoC 800 may be implemented or configured as a communications transceiver that is capable of implementing aspects of adaptive cache management to process data received through a communication channel or network interface. Alternatively or additionally, the transceiver interface may also include or implement a signal interface to communicate radio frequency (RF), intermediate frequency (IF), or baseband frequency signals off-chip to facilitate wired or wireless communication through transceivers, PHYs, and MACs coupled to the SoC 800. For example, the SoC 800 may include a transceiver interface configured to enable storage over a wired or wireless network, such as to provide a network attached storage (NAS) volume or storage accelerator with adaptive cache management for communicated data and/or stored data.

The SoC 800 also includes an adaptive cache manager 136, a telemetry unit 138, caching and prefetching engine 322/324, and/or ML models 326, which may be implemented separately as shown or combined with a media controller, a host interface, or a media interface. In accordance with various aspects of adaptive cache management, the adaptive cache manager 136 obtains, from the telemetry unit 138, telemetry information relating to access of the cache memory 134 and storage media coupled to the SoC 800. Based on the telemetry information, the adaptive cache manager 136 determines a cache policy for the cache memory 134 and applies the cache policy to the cache memory 134 to modify settings of the caching and prefetching engine 322/324 (or cache schemes implemented by the engine). Any of these entities may be embodied as disparate or combined components, as described with reference to various aspects presented herein. For example, the adaptive cache manager 136 may be implemented as part of a storage media controller, memory controller, or other media aggregator or accelerator. Examples of these components and/or entities, or of corresponding functionality, are described with reference to the respective components or entities of the operating environment 100 of FIG. 1, storage controllers and configurations of FIGS. 2-4, and/or the methods 500 through 700 of FIGS. 5-7. The adaptive cache manager 136 or components thereof, either in whole or in part, may be implemented as processor-executable instructions maintained by the memory 806 and executed by the processor 804 to implement various aspects and/or features of adaptive cache management.

The adaptive cache manager 136 may be implemented independently or in combination with any suitable component or circuitry to implement aspects described herein. For example, the adaptive cache manager 136 may be implemented as part of a DSP, ASIC, processor/storage bridge, I/O bridge, GPU, memory controller, storage controller, arithmetic logic unit (ALU), or the like. The adaptive cache manager 136 may also be provided integrally with other entities of the SoC 800, such as integrated with the processor 804, the memory 806 (e.g., controller cache), the firmware 808, or media interface of the SoC 800. Alternatively or additionally, the adaptive cache manager 136, telemetry unit 138, caching and prefetching engine 322/324, ML models 326, and/or other components of the SoC 800 may be implemented as hardware, firmware, fixed logic circuitry, or any combination thereof.

Figure 9:
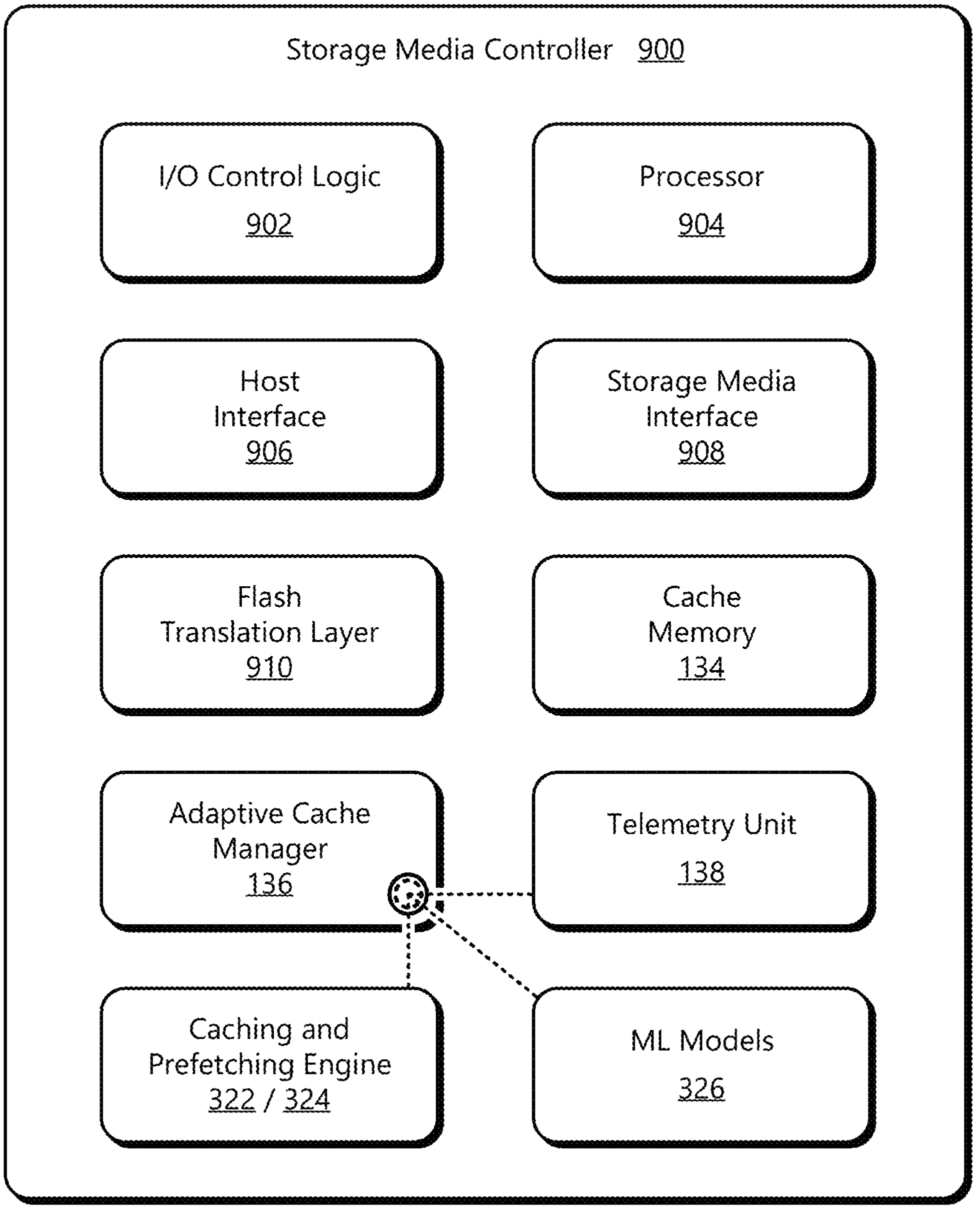
FIG. 9 illustrates an example storage media controller in which an adaptive cache manager can be implemented in accordance with one or more aspects.

As another example, consider FIG. 9 which illustrates an example storage media controller 900 in accordance with one or more aspects of adaptive cache management. In various aspects, the storage media controller 900 or any combination of components thereof may be implemented as a storage drive controller (CXL-enabled SSD controller), distributed storage center controller (e.g., among a host and SSDs), storage media controller, NAS controller, Fabric interface, NVMe target, or storage aggregation controller for solid-state storage media. In some cases, the storage media controller 900 is implemented similarly to or with components of the SoC 800 as described with reference to FIG. 8. In other words, an instance of the SoC 800 may be configured as a storage controller, such as the storage media controller 900 to enable data communication, data access, or data storage with aspects of adaptive cache management.

As shown in FIG. 9, the storage media controller 900 includes input-output (I/O) control logic 902 and a processor 904, such as a microprocessor, a processor core, an application processor, a DSP, or the like. In some aspects, the processor 904 and firmware of the storage media controller 900 may be implemented to provide various functionalities associated with adaptive cache management, such as those described with reference to any of the methods 500 through 700. The storage media controller 900 also includes a host interface 906 (e.g., CXL, SATA, PCIe, NVMe, or Fabric interface) and a storage media interface 908 (e.g., NAND interface or Flash interface), which enable access to a host system and storage media, respectively. The storage media controller also includes a Flash translation layer 910, a cache memory 134, an adaptive cache manager 136, which can be operably coupled with a caching and prefetching engine 322/324, a telemetry unit 138, and/or ML models 326 of the controller. In some aspects of adaptive cache management, the adaptive cache manager 136 and components thereof may interact with host interface 906, storage media interface 908, and cache memory 134 to implement adaptive cache management to select, determine, configure, and/or apply cache policies to the cache memory 134 to improve caching efficiency, reduce cache access latency, or increase host application performance.

Any or all of these components may be implemented separately as shown or combined with the processor 904, the host interface 906, and/or the storage media interface 908 of the storage media controller 900. Examples of these components and/or entities, or of corresponding functionality, are described with reference to the respective components or entities of the operating environment 100 of FIG. 1, storage controllers and components of FIGS. 2-4, or operations of the methods 500 through 700. In accordance with various aspects of adaptive cache management, the adaptive cache manager 136 of the storage media controller 900 can obtain, from the telemetry unit 138, telemetry information relating to access of the cache memory 134 and access of the storage media coupled to the controller. Based on the telemetry information, user-provided parameters, and/or ML-based parameters, the adaptive cache manager determines a cache policy for the cache memory and applies the cache policy to the cache memory to modify a caching scheme or a prefetching scheme for the data of the cache memory. By so doing, the adaptive cache manager may dynamically alter the caching and prefetch activities of the cache memory to improve efficiency of the cache memory.

Although the subject matter of adaptive cache management for a storage system has been described in language specific to structural features and/or methodological operations, it is to be understood that the subject matter recited by the appended claims is not necessarily limited to the specific examples, features, configurations, or operations described herein, including orders in which they are performed.

What is claimed is:

1. A method for adaptive cache management implemented by a storage media system, comprising:

receiving, via a compute express link (CXL) interface, transaction packets for access to data of a cache memory of the storage media system;

determining that the cache memory stores a first data requested by a first transaction packet of the transaction packets;

accessing, responsive to the first transaction packet, the cache memory to obtain the first data;

determining first telemetry information relating to access of the cache memory responsive to the first transaction packet, the first telemetry information comprising a size of a data request to the cache memory, a cache address, an age of data of a cache line, or frequency of access to a cache line;

determining that the cache memory does not store a second data requested by a second transaction packet of the transaction packets;

accessing, responsive to the second transaction packet, storage media of the storage media system to obtain the second data;

determining second telemetry information relating to access of the storage media responsive to the second transaction packet, the second telemetry information comprising a size of a data request to the storage media, a logical block address (LBA) of the storage media, an age of data at an LBA of the storage media, or frequency of access to an LBA of the storage media;

determining a cache policy for the cache memory based on the first telemetry information and the second telemetry information; and applying the cache policy to the cache memory to modify a caching scheme or a prefetching scheme for the data of the cache memory.

2. The method of claim 1, further comprising:

receiving, via the CXL interface, cache parameters provided by an application or a user; and determining the cache policy based on the first telemetry information, the second telemetry information, and the cache parameters provided by the application or the user.

3. The method of claim 1, further comprising:

configuring a machine learning model using the first telemetry information and the second telemetry information, and wherein:

the cache policy for the cache memory is determined using the machine learning model.

4. The method of claim 3, wherein configuring the machine learning model comprises training or retraining the machine learning model based on the first telemetry information and the second telemetry information.

5. The method of claim 4, wherein retraining the machine learning model is performed in response to:

a duration of time lapsing; or a metric of the cache memory falling below a performance threshold of the cache memory.

6. The method of claim 1, further comprising:

determining metrics for the cache memory based on the first telemetry information and the second telemetry information, and wherein:

the cache policy for the cache memory is determined based on the metrics of the cache memory.

7. The method of claim 6, wherein the metrics for the cache memory comprise a cache hit rate, a cache byte hit rate, a cache miss rate, cache latency, or cache access time.

8. The method of claim 1, wherein the transaction packets received comprise are compliant with a CXL memory protocol or a CXL cache protocol.

9. The method of claim 1, wherein the transaction packets received comprise a load instruction to load data from the cache memory or a store instruction to store data to the cache memory.

10. The method of claim 1, wherein:

the cache memory comprises a dynamic random-access memory (DRAM) of the storage media system; and the storage media comprises a NAND memory of the storage media system.

11. An apparatus comprising:

a cache memory;

a compute express link (CXL) interface configured to receive transaction packets for access to the cache memory;

storage media configured to store data;

a storage media controller configured to enable transfers of the data between the cache memory and the storage media;

a telemetry unit operably coupled with the CXL interface and the storage media controller; and an adaptive cache manager configured to:

determine that the cache memory stores a first data requested by a first transaction packet of the transaction packets;

access, responsive to the first transaction packet, the cache memory to obtain the first data;

obtain, from the telemetry unit, first telemetry information relating to the access of the cache memory responsive to the first transaction packet, the first telemetry information comprising a cache address, an age of data of a cache line, or frequency of access to a cache line;

determine that the cache memory does not store a second data requested by a second transaction packet of the transaction packets;

accessing, responsive to the second transaction packet, the storage media to obtain the second data;

obtain, from the telemetry unit, second telemetry information relating to access of the storage media responsive to the second transaction packet, the second telemetry information comprising a logical block address (LBA) of the storage media, an age of data at an LBA of the storage media, or frequency of access to an LBA of the storage media;

determine a cache policy for the cache memory based on the first telemetry information and the second telemetry information; and apply the cache policy to the cache memory to modify a caching scheme or a prefetching scheme for the data stored by the cache memory.

12. The apparatus of claim 11, wherein the adaptive cache manager is further configured to:

receive, via the CXL interface, cache parameters provided by an application or a user; and determine the cache policy based on the first telemetry information, the second telemetry information, and the cache parameters provided by the application or the user.

13. The apparatus of claim 11, wherein the adaptive cache manager is further configured to:

configure a machine learning model using the first telemetry information and the second telemetry information, and wherein:

the cache policy for the cache memory is determined using the machine learning model.

14. The apparatus of claim 11, wherein the adaptive cache manager is further configured to:

determine metrics for the cache memory based on the first telemetry information and the second telemetry information, and wherein:

the cache policy for the cache memory is determined based on the metrics of the cache memory.

15. The apparatus of claim 14, wherein the metrics for the cache memory comprise a cache hit rate, a cache byte hit rate, a cache miss rate, cache latency, or cache access time.

16. A System-on-Chip comprising:

a cache memory;

a compute express link interface (CXL) interface configured to receive transaction packets for access to the cache memory;

a storage media controller with a storage media interface and configured to enable transfers of data between the cache memory and storage media coupled to the storage media interface;

a telemetry unit operably coupled with the cache memory and the storage media controller; and an adaptive cache manager configured to:

determine that the cache memory stores a first data requested by a first transaction packet of the transaction packets;

access, responsive to the first transaction packet, the cache memory to obtain the first data;

receive, from the telemetry unit, first telemetry information relating to the access to the cache memory responsive to the first transaction packet, the first telemetry information comprising a size of a data request to the cache memory, an age of data of a cache line, or a cache address;

determine that the cache memory does not store a second data requested by a second transaction packet of the transaction packets;

access, responsive to the second transaction packet, the storage media to obtain the second data;

receive, from the telemetry unit, second telemetry information relating to access of the storage media responsive to the second transaction packet, the second telemetry information comprising a size of a data request to the storage media, a logical block address (LBA) of the storage media, or an age of data at an LBA of the storage media;

determine a cache policy for the cache memory based on the first telemetry information and the second telemetry information; and apply the cache policy to the cache memory to modify a caching scheme or a prefetching scheme for the data stored by the cache memory.

17. The System-on-Chip of claim 16, wherein the adaptive cache manager is further configured to:

receive, via the CXL interface, cache parameters provided by an application or a user; and determine the cache policy based on the first telemetry information, the second telemetry information, and the cache parameters provided by the application or the user.

18. The System-on-Chip of claim 16, wherein the adaptive cache manager is further configured to:

configure a machine learning model using the first telemetry information and the second telemetry information, and wherein:

the cache policy for the cache memory is determined using the machine learning model.

19. An apparatus comprising:

a cache memory;

a compute express link (CXL) interface configured to receive transaction packets for access to the cache memory;

an interface configured to enable transfers of data to storage media that is coupled to the interface;

a storage controller configured to enable transfers of the data between the cache memory and the storage media;

means for determining that the cache memory stores a first data requested by a first transaction packet of the transaction packets and accessing, responsive to the first transaction packet, the cache memory to obtain the first data;

means for obtaining first telemetry information relating to the access to the cache memory responsive to the first transaction packet, the first telemetry information comprising a size of a data request to the cache memory, a cache address, an age of data of a cache line, or frequency of access to a cache line;

means for determining that the cache memory does not store a second data requested by a second transaction packet of the transaction packets and accessing, responsive to the second transaction packet, the storage media to obtain the second data;

means for obtaining second telemetry information relating to access of the storage media responsive to the second transaction packet, the second telemetry information comprising a size of a data request to the storage media, a logical block address (LBA) of the storage media, an age of data at an LBA of the storage media, or frequency of access to an LBA of the storage media;

means for determining a cache policy for the cache memory based on the first telemetry information and the second telemetry information; and means for applying the cache policy to the cache memory to modify a caching scheme or a prefetching scheme for the data stored by the cache memory.

20. The apparatus of claim 19, further comprising:

means for configuring a machine learning model using the first telemetry information and the second telemetry information, and wherein:

the means for determining cache policy use parameters provided by the machine learning model.

* * * * *